D. P. DAVIES.
SEALING DEVICE FOR ROTARY STRUCTURES.
APPLICATION FILED MAY 23, 1921.
1,428,943.
Patented Sept. 12, 1922.
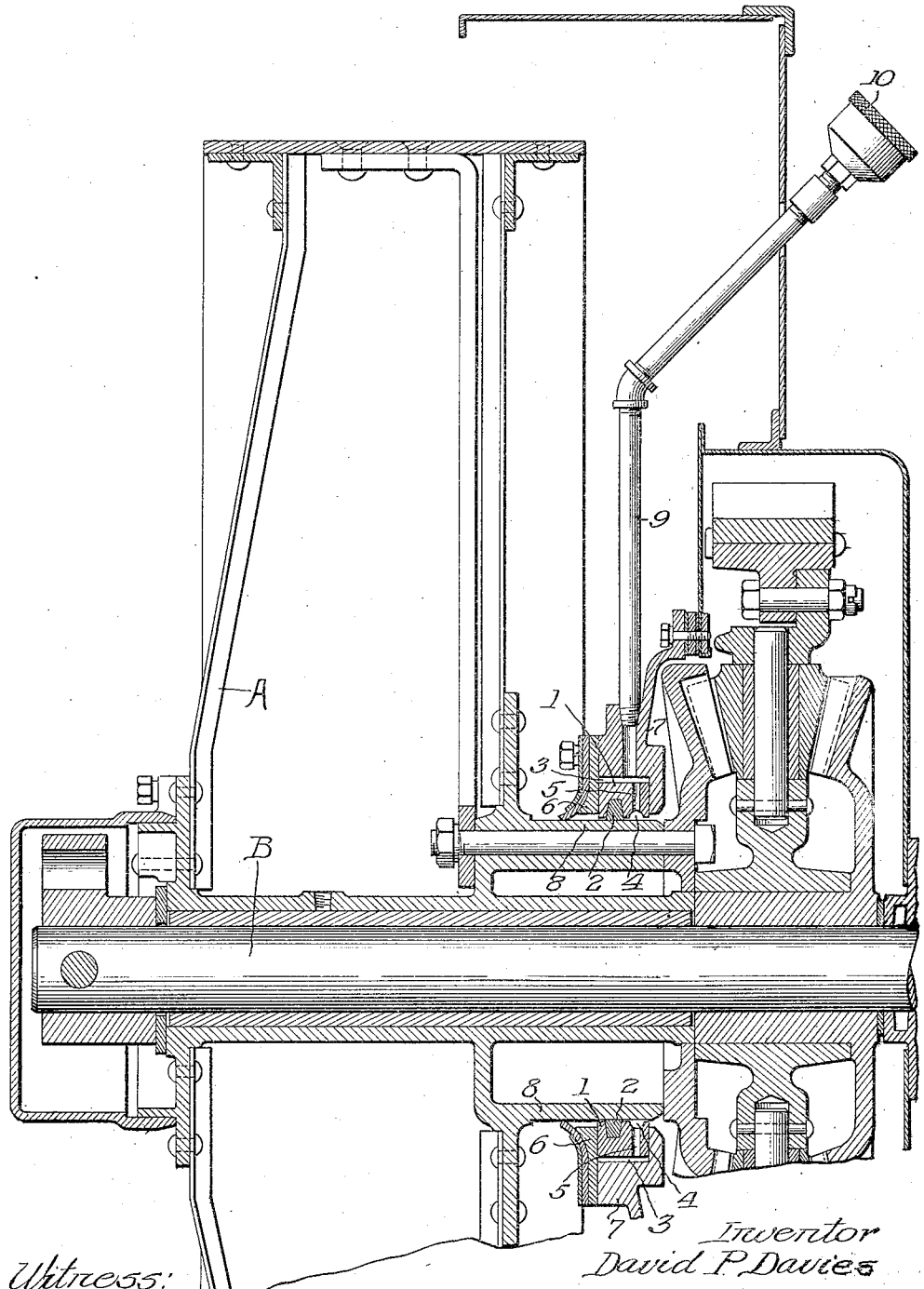
Inventor
David P. Davies
By James A. Walsh,
Atty
Witness:

Patented Sept. 12, 1922.

1,428,943

UNITED STATES PATENT OFFICE.

DAVID P. DAVIES, OF RACINE, WISCONSIN, ASSIGNOR TO J. I. CASE THRESHING MACHINE COMPANY, OF RACINE, WISCONSIN, A CORPORATION.

SEALING DEVICE FOR ROTARY STRUCTURES.

Application filed May 23, 1921. Serial No. 471,620.

*To all whom it may concern:*

Be it known that I, DAVID P. DAVIES, a citizen of the United States, residing at Racine, in the county of Racine and State of Wisconsin, have invented certain new and useful Improvements in Sealing Devices for Rotary Structures, of which the following is a specification.

In the assemblage of rotary elements within a housing, such for instance as those which work about the shaft of a tractor, or equivalent driving or driven element, it is essential to lubricate such working parts, and where a shaft or the like projects from such housing it becomes necessary to provide a seal approximately adjacent the location where such shaft extends through the housing or enclosure, for the purpose of preventing leakage of oil by the shaft, or its bearings, which, as is well known, tends to flow from such housing or enclosure, and such leakage I not only prevent but at the same time preclude the working or passage from the outside of the shaft bearing of foreign matter such as water, sand, dirt, and the like, into the housing, thereby preventing abnormal wear between the revolving or working parts of a structure of the character contemplated. I am aware that it is common to employ a seal at the point indicated, which usually comprises a felt or other resilient ring secured in a groove, and which material, coming in contact with the shaft or bore through which the shaft extends, is depended upon because of its inherent resiliency to make an adequate seal, but so far as I have observed certain objections exist to such arrangements, in that the relative rotary motion between the resilient material and the shaft causes such material to wear away rapidly so that eventually, as there is no contact between the material and shaft, leakage of the lubricating oil occurs, and further, any such slight amount of wear necessarily affects the concentricity of the shaft relative to such resilient ring, which causes the shaft or its hub to contact closer to a certain part of the ring instead of uniformly to the entire surface thereof, under which condition, as will be understood, part of the periphery of the ring will not be contacted with the hub or shaft, thus leaving an opening or gap between such element and ring and thereby destroying the sealing and functioning qualities of such ring as a whole. As indicated, it is my object to improve the type of seal referred to, and by which improvement I have demonstrated by practical experience that I overcome the difficulties set forth in a simple and positive manner, as will be hereinafter more fully set forth.

As a means of illustrating the application of my improvement I have in the accompanying drawing, forming part hereof, shown in fragment and in partially detail section, a tractor wheel of approved form mounted upon a shaft, as is common, said parts being indicated by the reference characters A and B, other parts which are commonly employed in the assemblage of such a wheel and its driving mechanisms being of a well known character and not specifically pointed out herein.

In said drawing, 1, indicates a preferably circular ring embodying a groove in which is mounted a sealing ring, 2, comprising resilient material, said ring 1 also embodying a groove, 4, for the retention of grease or other lubricant which forms a ring about hub, 8, radial channels, 5, of a number as may be desired being drilled through said ring 1 and leading to said groove 4. In the type of bearing which I have chosen to illustrate I provide an outer cover plate, 6, adapted to prevent ring 1 from endwise motion and which ring is held therebetween and a cover, 7, which forms a part of the closure for the gears or working parts of a tractor, as plainly indicated at the right in the drawing. The hub of the wheel (or shaft) to be sealed is indicated, at 8, about which the ring 1 is mounted, and to which lubricant is conveyed by the conduit, 9, leading from grease cup, 10, which conduit discharges into an annular space, 3, between ring 1 and the cover or closure 7, forming a grease ring therebetween.

The ring 1 is so proportioned as to permit a free sliding fit on the hub 8, or otherwise, while the sealing ring, 2, of resilient material is of such size that it makes a tight contact with said hub. Said ring 1 is secured to the hub in such manner that there will be no relative rotary motion between these parts, while at the same time such ring is permitted to move endwise to take care of such slight end motion as these working parts may have; and as no continuous rotary motion exists between the resilient ring 2 and hub 8, no wear of said ring occurs. Said ring 1 is considerably less in diameter than the bore of the groove formed in cover 7, which difference in diameter produces the annular space 3 between said ring and cover, and said ring is of a thickness which permits a free running fit between cover plate 6 and cover 7. This annular groove 3 is filled with grease from the cup 10 through the conduit 9, which grease forms a seal between the parts through which oil is prevented from working out around ring 1, and which also prevents extraneous matter from entering the housing or enclosure formed by cover 7 and parts connected therewith.

It will be understood from the construction shown that if for any reason sufficient wear should take place to affect the concentricity of the hub 8 with the groove machined in cover 7 in which ring 1 is seated, said ring will gradually move out of concentric position, but which movement will not in any manner affect the seal as the grease ring contained in the annular groove 3 will simply move in a different position and thus be adjusted to compensate the non-concentric position of the parts; and such non-concentric position of said ring 1 will not affect the relation of the hub 8 with the resilient ring 2 or grease groove 4, which latter is for the purpose of sealing the hub against end motion parallel with the shaft axis.

I claim as my invention:

1. The combination, with a rotary element, of a ring having radial channels and a grease groove communicating with said channels, and a sealing ring mounted in said ring.

2. The combination, with a rotary element, of a ring surrounding the same, said ring embodying a grease groove, a sealing ring in said ring, means within which said first mentioned ring is mounted, and means for supplying grease thereto to form sealing means.

3. The combination, with a rotary element, of a housing having a channel therein, a ring in said housing and spaced therefrom circumferentially to permit the flow of grease between said ring and housing, and a sealing ring mounted in said first mentioned ring for preventing foreign matter from passing beyond said sealing ring.

4. A sealing device for rotary structures comprising a ring having a circumferential grease retaining groove therein and grease conducting channels leading to such groove, a resilient ring mounted in said first mentioned ring for preventing the travel of foreign matter, means for housing said rings, and means for conveying grease to said first mentioned ring.

5. The combination, with a rotary element, of a housing having a channel therein, a ring in said channel and spaced therefrom circumferentially, a grease ring in said space, a sealing ring mounted in said first mentioned ring, and a grease ring interposed between said element and said first mentioned ring.

In testimony whereof I affix my signature.

DAVID P. DAVIES.